(12) United States Patent
Kamaraju

(10) Patent No.: US 11,831,965 B1
(45) Date of Patent: Nov. 28, 2023

(54) IDENTIFIABLE INFORMATION REDACTION AND/OR REPLACEMENT

(71) Applicant: STREEM, LLC, Portland, OR (US)

(72) Inventor: Pavan K. Kamaraju, London (GB)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/858,702

(22) Filed: Jul. 6, 2022

(51) Int. Cl.
*H04N 21/81* (2011.01)
*H04N 21/266* (2011.01)

(52) U.S. Cl.
CPC ......... *H04N 21/816* (2013.01); *H04N 21/266* (2013.01)

(58) Field of Classification Search
None
See application file for complete search history.

(56) References Cited

U.S. PATENT DOCUMENTS

| | | | | |
|---|---|---|---|---|
| 10,893,329 | B1 * | 1/2021 | Trim | G06V 20/46 |
| 2009/0313546 | A1 * | 12/2009 | Katpelly | H04N 21/25891 715/723 |
| 2020/0104522 | A1 * | 4/2020 | Collart | G06T 19/20 |
| 2020/0134298 | A1 * | 4/2020 | Zavesky | H04N 7/157 |
| 2020/0275156 | A1 * | 8/2020 | He | H04N 21/4126 |
| 2022/0370918 | A1 * | 11/2022 | Cassel | A63F 13/60 |

OTHER PUBLICATIONS

Nguyen et al., "Deep Learning for Deepfakes Creation and Detection: A Survey", School of Information Technology et al., Feb. 6, 2022, pp. 1-20.

\* cited by examiner

*Primary Examiner* — Junior O Mendoza
(74) *Attorney, Agent, or Firm* — Schwabe Williamson & Wyatt

(57) ABSTRACT

Embodiments include systems and methods for filtering augmented reality ("AR") data streams, and in particular, video and/or audio streams to change or remove undesirable content, such as personally identifiable information, embarrassing content, financial data, etc. For example, a handheld device may capture video using a built in camera, and as needed superimpose AR objects on the video to change its content. A cloud service may host an AR session between the handheld device and a remote machine. The cloud service and remote machine may also operate their own filter on the AR data to remove and/or replace content to comply with their interests, regulations, policies, etc. Filtering may be cumulative. For example, the handheld device may remove financial data before it leaves the device, and then the cloud service may replace commercial logos before sharing AR data between session participants.

18 Claims, 9 Drawing Sheets

IDENTIFIABLE INFORMATION REDACTION AND/OR REPLACEMENT

TECHNICAL FIELD

The present disclosure relates to the field of augmented reality (AR), and specifically to processing AR data for an AR session to replace undesirable content identified in the AR data before the AR session is accessed.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect content in the video, e.g., features and elements such as planes, surfaces, faces, objects, people, parts of people, logos, advertising, and other recognizable shapes, objects, items, etc. Detected content, combined in some implementations with data from depth sensors, measurement sensors (e.g., LIDAR), computer vision, and/or motion information captured from motion sensors such as a MEMS gyroscope and accelerometers, can facilitate AR software in creating a model, e.g., a point cloud, mesh, polygonal model, or other model of a three-dimensional space that may be mapped onto or otherwise correspond to an environment such as a room, location, an object, or other space.

Such a model enables AR-based applications to analyze and interact with objects within the model, as well as to generate and place virtual objects within the model. The model may be based on pictures and/or video captured by a smartphone or other mobile device, camera(s) and/or other device(s) of a mobile device or other devices in the environment. Characteristics and/or status or other data generated by and/or associated with sensors, measurement devices, etc. used to help generate the model may be stored in or otherwise associated with the model. Models may be analyzed to recognize objects, content, semantic as well as semantic information. Artificial Intelligence may be used to facilitate or automate tasks.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
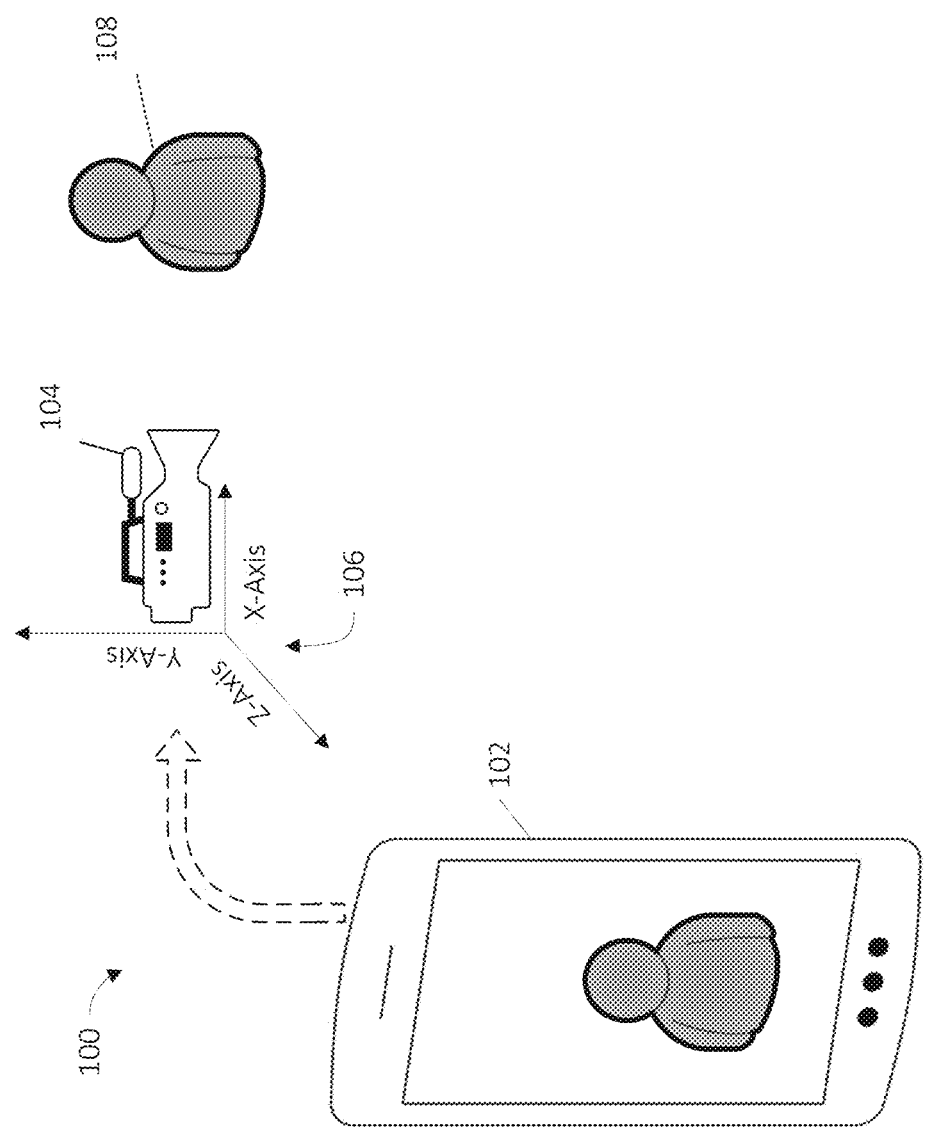
FIG. 1 illustrates a block diagram of the components of a system for capturing a video stream and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may he described as multiple discrete operations in turn, in a manner that may be helpful in understanding embodiments; however, the order of description should not be construed to imply that these operations are order dependent. The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element. The description may use the terms "embodiment" or "embodiments," which may each refer to one or more of the same or different embodiments. Furthermore, the terms "comprising," "including," "having," and the like, as used with respect to embodiments, are synonymous.

A device that supports augmented reality ("AR") may provide an AR session on a device-local basis (e.g., not requiring communication with a remote system), such as allowing a user of the device to capture a video using a camera built into the device, and superimpose AR objects upon the video as it is captured, or after capture. The device may access a cloud service that may assist with managing and/or hosting the AR session. The cloud service may assist with coordinating an AR session between the device (e.g. a handheld phone) and a remote machine (e.g. a computer used by a remote support agent). Selected ones of the device, cloud service and remote machine may operate to modify (e.g., filter) content of an AR session to remove and/or replace content within an AR session to comply with local and/or remote interest, desire, regulation, policy, etc. For example, there may be a policy to remove personally identifiable information (PII) from a video stream in an AR session, and such removal (and/or substitution for something else) may be performed by the device to prevent the PII leaving a local environment, and/or it may be addressed by the cloud service to prevent access or viewing of the PII by a remote machine, and/or by the remote machine to prevent access, viewing, etc. by entities with access to the remote machine.

It will be appreciated modification, transformation, filtering, etc. may occur in any of one or more machines, devices, routers, hosts, services, whether internal or edge devices, such that a policy may be complied within one or more locations by one or more machines and/or devices and/or software or hardware based tools. Similarly, if there is a law, regulation, or other controlling requirement, such requirement may be the basis for other modifications to an AR session. An entity engaged in the AR session may have an interest, desire, etc. to insulate AR session participants from certain content, whether it be embarrassing, financial data, identity data, or for example, exposure to competitor IP, logos, or the like, where such content like may be obscured, and/or replaced with a desired placeholder. It will be appreciated the nature of content to exclude can be anything that may be determined/recognized in an AR session, Support for superimposing AR objects and/or obscuring or otherwise obfuscating content in an AR session is typically provided by the device's operating system, with the operating system providing an AR application programming interface (API). Examples of AR APIs include Apple's ARKit, provided by iOS, Google's ARCore, provided by Android, as well as others such as PTC Inc.'s Vuforia Engine, Unity Technology's Unity, the Blender Foundation's Blender, Amazon's Sumerian, etc. The APIs typically use both the stream of frames captured by the device camera as well as other available motion data, such as a gyroscope and/or accelerometers contained within the device, to compute a point cloud. The available motion data allows the camera pose, the position of the camera in space relative to its surrounding environment, to be determined as the device moves. Knowing the camera pose helps establish an accurate point cloud when using a handheld or similar mobile device that may move while simultaneously capturing the surrounding environment.

The point cloud typically includes one or more points that are indicated by an x, y position within the device's environment, such as coordinates on a screen attached to the device while the one or more points are visible to the camera. A depth (or z-axis) point may also be measured directly (if the device is so equipped) or computed for each of the one or more points. The x, y, and z positions of each point in the point cloud may be tied to or expressed with respect to an identified anchor feature within the frame, e.g. a corner or edge of an object in-frame, which can be readily identified and tracked for movement between frames, or to some other fixed reference point. The associated x, y, and z values in combination with camera pose data further allow each point in the point cloud to be identified in space relative to the device. As will be appreciated, x, y, and z values calculated with respect to a moving device will continuously change for each detected/calculated point as the camera of the capturing device moves in space relative to the anchor features. In some implementations, each point in the point cloud may include additional data, such as a confidence value indicating the API's estimate of the accuracy of the computed depth value, location of the anchor point, and/or possibly other extrapolated values.

While some embodiments contemplate using a point cloud, other embodiments may use a polygonal model, or mesh model, instead of or in addition to a point cloud model. For discussion purposes below, use of a point cloud may be assumed, but one skilled in the art will appreciate the discussion below may be applied to a polygonal model. A calculated point cloud allows AR objects to be placed within a scene and appear to be part of the scene, viz. the AR object moves through the camera's view similar to other physical objects within the scene as the camera moves. Further, by employing object detection techniques along with motion data, in some implementations the API can maintain track of points that move out of the camera's field of view. This allows a placed AR object to disappear off-screen as the camera moves past its placed location, and reappear when the camera moves back to the scene location where the AR object was originally placed. In addition, if content within a video steam of an AR session has been filtered, e.g., content has been transformed or hidden (edited out so the video looks like it was never there), blurred, replaced (substituted with something else that appears to fit, such as a computer generated face to replace a real face in the video stream), filtered effects may operate as AR objects in the AR session such that a filtered effect may disappear off-screen and reappear as appropriate.

As may be understood from the foregoing description, the point cloud represents location data about the physical world relative to and surrounding the capturing device. The various points in the point cloud may thus (in most implementations) be expressed as values relative from the capturing device. When the capturing device moves, e.g. is panned or tilted, in a sense, these values change, e.g. can be recomputed using sensed motion data about the movements of the capturing device, as though the world were moving about the capturing device's position, with the capturing device serving as a fixed reference point. The motion data captured by the capturing device, then, effectively expresses how the world moves about the capturing device. As the capturing device moves, an increasing amount of the world passes through the field of view of the capturing device. When combined with continued tracking/storage of detected points that move outside the camera's field of view, the point cloud representing the world detected and viewed through the capturing device's camera that is initially generated can be progressively increased and expanded.

The captured point cloud can be used to identify the location of one or more of the points in the point cloud relative to each other. For fixed or stationary objects that are mapped within the point cloud, the spatial relationship of two points within the point cloud tied to stationary objects are expected to remain consistent, even while the position of the device and its camera may be in a relative state of flux as the camera changes orientation and position with device movements. These stable positions may be subject only to refinement in position as the device is able to capture additional data around a given point when the point is within view of the device. Furthermore, the spatial relationship of points within the point cloud can persist between points that are not normally simultaneously in frame, viz. the device camera must be panned or moved away from one point to view another. The use of camera movement data/camera pose can help establish the spatial relationship between two points within the point that are captured at different locations by the device camera.

With the spatial position of various points within the point cloud determined, measurements can be made between arbitrary fixed points within the point cloud. Thus, in disclosed embodiments, measurements can be taken both of objects fully within the frame of the device camera, as well as objects where the device must be panned or moved to fully capture, e.g. a long or tall object in a room where the device camera cannot be positioned to capture the entirety of the object. Still further, disclosed embodiments are not limited to linear measurements. By including reference to three, four, or more points, arbitrary areas can be computed from at least three point cloud points that define a plane, as well as volumes for arbitrary 3D regions that can be defined by reference to at least four point cloud points.

Most devices capable of capturing point cloud data are further capable of network communications with a remote device or server. The device may transmit the point cloud data over the network to the remote device or server, allowing the remote device or server to compute distances, areas, and/or volumes from the point cloud data by internal reference between points within the point cloud. Still further, by also transmitting camera pose data as a continually changing data stream, a user of a remote device or server could instruct a user of the device to position the device camera at desired locations to capture additional point cloud data that may have not been previously captured. This additional data may then be used to take measurements of an object that was only partially viewable. The ability to provide guidance over a remote communications session, and to direct a user of the device to capture data for measurements of portions of objects, can enable a user of the remote device or server to provide service or assistance to a user of the device. Other possible embodiments will be described herein as appropriate.

It will be appreciated some devices may have specific hardware and/or software for creating point cloud data, e.g., Apple TrueDepth, Google Android Q Samsung "time of flight", LiDAR, etc. It will be further appreciated that 3D models may be developed at least in part by creating a polygonal mesh (a 3D mesh) for an environment, such as a room, office, building, object(s), etc. The model may be defined with respect to 3D data captured within the environment, and/or based on one or more 2D photos of the environment, and/or based on one or more point clouds corresponding to the environment. Point clouds may be used to generate a 3D mesh for a model for the environment, or to regenerate and/or expand and/or enhance an existing 3D mesh. In some embodiments, one or more different 3D meshes may be generated from combining point clouds, and one may elect elements from the point clouds to retain in the combined 3D mesh. It will be appreciated a model may he examined to identify objects, people, graphics, etc. that may, as discussed above, be hidden, replaced, obfuscated, etc. as desired by one or more entity involved in an AR session.

FIG. 1 illustrates an example system 100 that may enable capture of an image or video that includes AR data. System 100 may include a mobile device 102. In the depicted embodiment of FIG. 1, mobile device 102 is a smartphone, which may be implemented as a computer device 800, to be discussed in greater detail below. Other embodiments may implement mobile device 102 as a variety of different possible devices, such as a computer (desktop or laptop), tablet, two-in-one, hybrid, smart glasses, or any other computing device that can accept a camera and provide necessary positional information, as will be discussed in greater detail herein. Mobile device 102 further may include a camera 104 and one or more spatial position sensors 106 (depicted by a series of axes), which provides information about the spatial position of camera 104, also known as the camera pose. It will be understood that camera 104 and spatial position sensors 106 may be contained within the body of mobile device 102. Camera 104 is used to capture the surrounding environment of mobile device 102, and by extension, the user. The environment may include one or more three-dimensional objects 108.

It should be appreciated that while mobile device 102 is depicted as a smartphone, mobile device 102 could be any device that includes a camera 104 and associated spatial position sensors 106 that can be moved about an environment. For example, in some embodiments mobile device 102 could be a laptop or tablet. In other embodiments, mobile device 102 could be a sensor package that includes camera 104 and spatial position sensors 106 which is in communication with a separate processing unit, such as a desktop computer or server. The sensor package may communicate with the separate processing unit via a wireless or wired link.

Camera 104 may be any camera that can provide a suitable video stream for the intended purpose of device 102. Where mobile device 102 is implemented as a smartphone or tablet, camera 104 may be one or more built-in cameras. In other embodiments, such as where mobile device 102 is a laptop, camera 104 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and mobile device 102. In other embodiments, such as where mobile device 102 is equipped with multiple cameras and/or similar sensors, one or more of the sensors may be configured to directly detect depth points, such as a 3D camera, stereoscopic camera, LIDAR, or other suitable depth-sensing technology.

Spatial position sensor 106 may be configured to provide positional information about the pose of camera 104, such as camera 104's pan and tilt. Other measured positional vectors may include camera movements, such as the camera rising or falling, or moving laterally, which allows the camera pose to be tracked and updated as mobile device 102 is moved through space in the environment relative to any static objects. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

Figure 2:
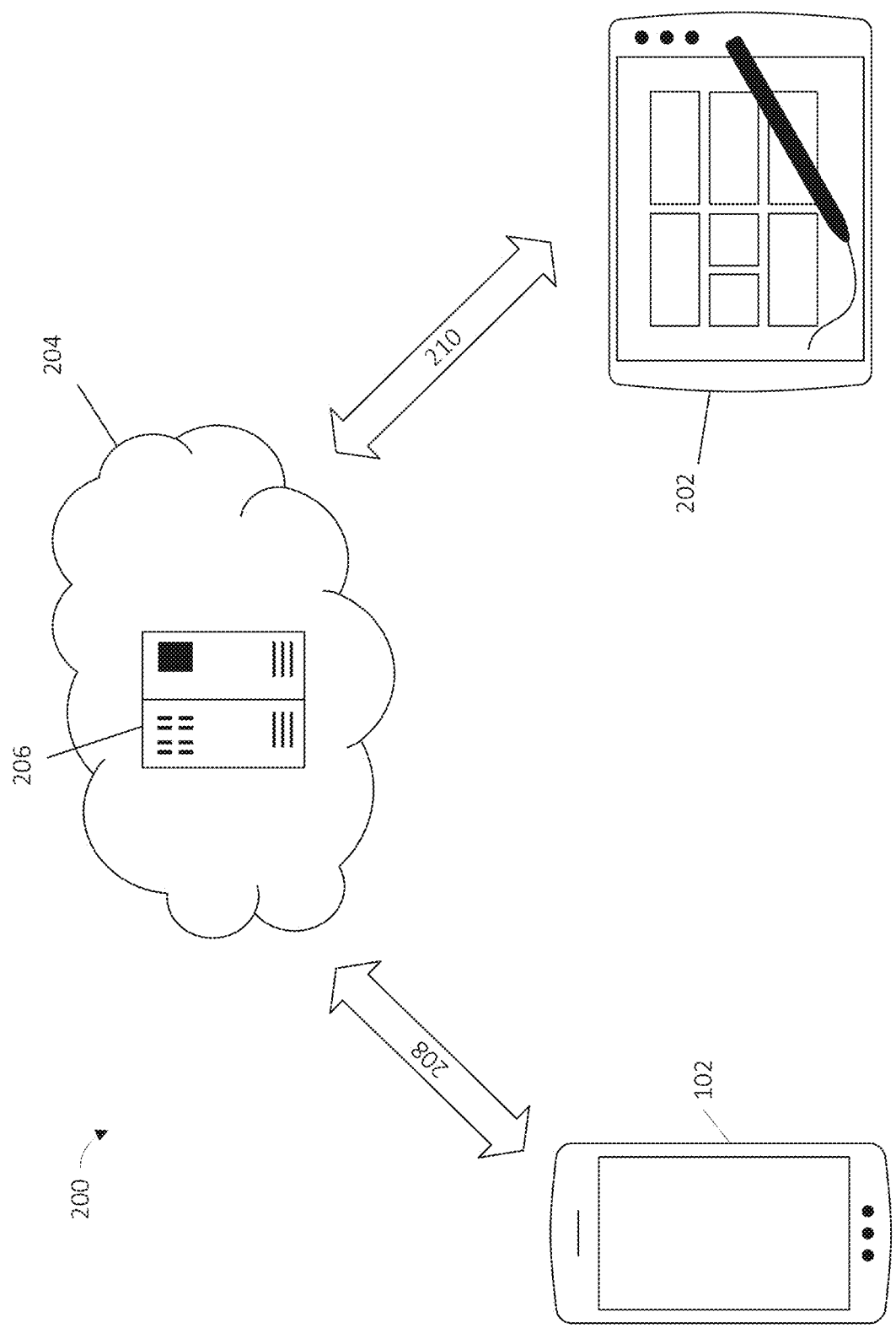
FIG. 2 illustrates a block diagram of the system components of one possible embodiment of an augmented reality system operable over a network, according to various embodiments.

FIG. 2 illustrates an example system 200 that embodies an augmented reality (AR) platform for interacting with a remotely provided video stream using AR objects. System 200 may include a mobile device 102 and a remote device 202, which in turn may be linked via a network 204. In embodiments, system 200 may receive a data stream from mobile device 102 that includes a video stream along with associated AR data, as described above with respect to FIG. 1. The data stream from mobile device 102 may then be transmitted to a remote device 202, where a user of the remote device 202 can interact with the data stream, including inserting AR objects or performing AR-based tasks, such as distance and area measurements, on the data stream that are reflected back to the mobile device 102.

Figure 8:
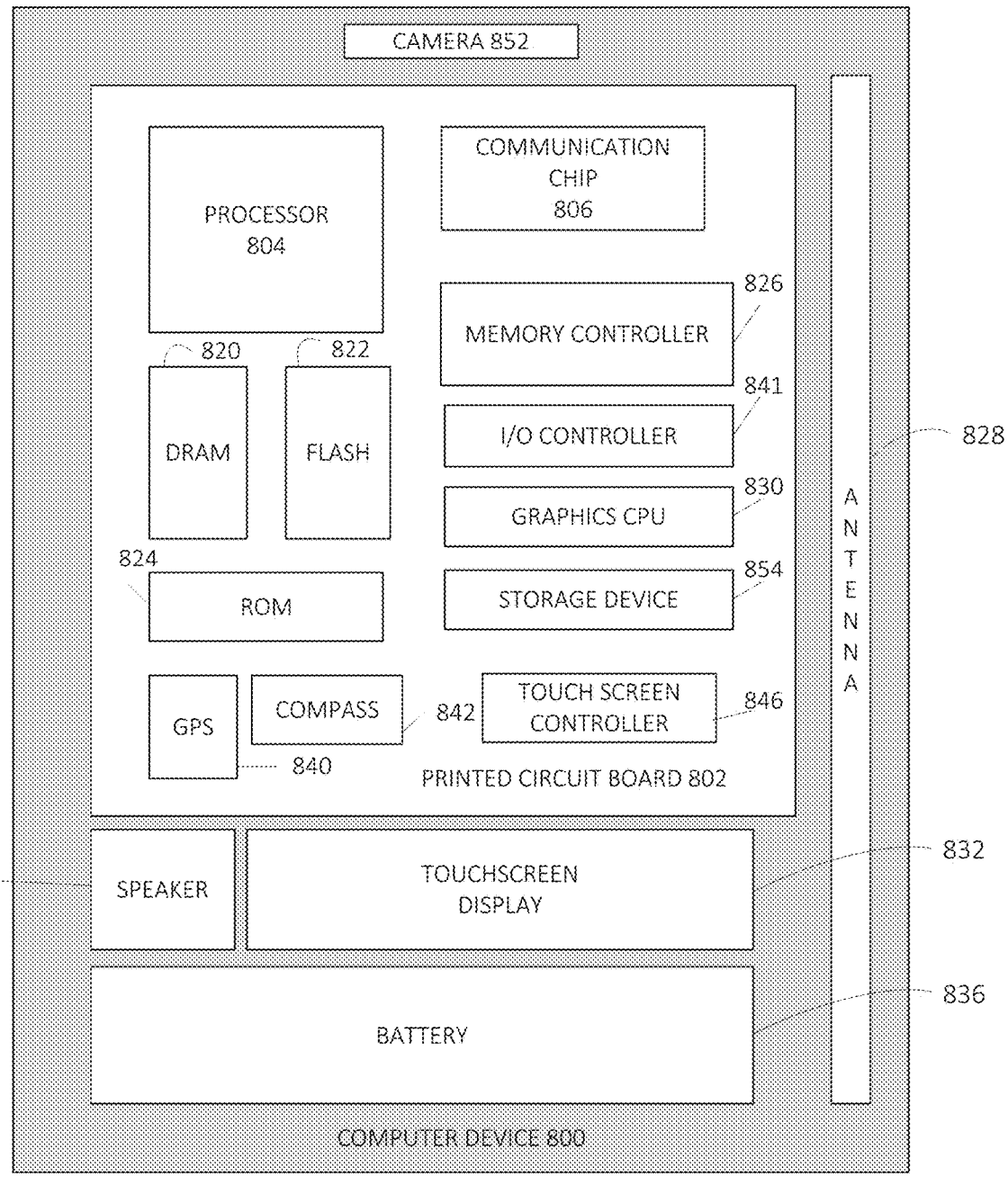
FIG. 8 is a block diagram of an example computer that can be used to implement some or all of the components of the system of FIG. 1, according to various embodiments.

Mobile device 102, described above with respect to FIG. 1, and remote device 202 may be a computer system such as the computer device 800 depicted in FIG. 8, and in some embodiments may be a mobile device such as a smartphone, tablet, or other similar device that has an integrated processor, screen, video camera, and network communications interface. In other embodiments, mobile device 102 may be a computer system with discrete components, e.g. the system box or CPU is distinct from I/O peripherals. Mobile device 102 and remote device 202 may be, but do not need to be, identical. For example, a service provider may prefer to use a dedicated computer terminal (e.g. a desktop or laptop computer) to interact with a mobile device 102. Likewise, a consumer may prefer to use a tablet or laptop as alternatives to a smartphone for mobile device 102.

Mobile device 102, in embodiments, is capable of transmitting video captured by camera 104 to remote device 202 over a network 204, as well as receiving data over network 204 that is supplied by a user of remote device 202. Remote device 204, similarly, is capable of receiving data such as video over network 204 from mobile device 102, and allowing a user of remote device 202 to place one or more AR objects into or otherwise interact with the received video. Remote device 202 can then transmit information about the placed AR object(s) over network 204 back to mobile device 102, whereupon mobile device 102 updates a display attached to or otherwise associated with (e.g., external wired and/or wireless displays and/or other output technology) mobile device 102 to depict and/or output the captured photos and/or video with the placed AR object(s).

Mobile device 102 may run a dedicated app to provide functionality for system 200. Other embodiments may allow functionality to be handled via a web site or web application (e.g. a software as a service, "SaaS", approach), Still other embodiments may use dedicated hardware, or a combination of software and hardware, to provide functionality for system 200 to the user. Likewise, remote device 202 may run a dedicated app to provide functionality for system 200, or use a web site, web application, dedicated hardware, or a combination of the foregoing. Some embodiments may use the same app or other method of delivering necessary functionality on both mobile device 102 and remote device 202, with functionality appropriate to the user enabled based upon a user-supplied credential or other indication of the user's role. For example, such an app may provide for capture and transmission of video when configured in a consumer role, and enable placement of one or more AR objects when configured for a service provider or assistant role. Other embodiments may provide separate apps (or other methods) for a user of mobile device 102 and remote device 202. In some embodiments, a central server 206, discussed below, may operate as or otherwise provide a cloud service and/or provide some or essentially all functionality for system 200, with any application or website on mobile device 102 and/or remote device 202 acting essentially as a front end for displaying and interacting with content provided by central server 206.

In embodiments and as mentioned above, system 200 provides the ability for a user of either mobile device 102 or remote device 202 to superimpose one or more AR objects to assist in the remote delivery of services or to facilitate a video communications session between mobile device 102 and remote device 202. Central server 206 may coordinate, synchronize or substitute, or assist in the coordination, synchronization or substitution, of AR objects or other AR session content between mobile device 102 and remote device 202. The functionality of synchronizing or substituting AR objects may be supplied by central server 206, mobile device 102, remote device 202, a combination of two or more of the foregoing, and/or via another provider or source external to system 200, depending upon the specifics of a given implementation. Although previous embodiments described placement of AR objects by the user of remote device 202, in other embodiments mobile device 102 may also allow placement and interaction with AR objects, which may further be transmitted and reflected on remote device 202.

Network 204 may be a network capable of supporting the exchange of a video feed between mobile device 102 and remote device 202 as well as augmented reality instructions. In some embodiments, network 204 may comprise the Internet, a local area network, wide area network, metropolitan area network, or a combination of the foregoing, or another suitable type or types of network communication. As can be seen, mobile device 102 may connect to network 204 via a communications link 208, and remote device 202 may connect to network 204 via a communications link 210. Each of communications links 208 and 210 may be any one or more of the foregoing network types. The various devices that comprise network 204 are well known to practitioners skilled in the relevant art, and will not be discussed further herein.

In some embodiments, network 204 comprises a server, collections or clusters of servers, one or more data centers, or other suitable means for data processing. For example, network 204 may be implemented as a cloud service, with mobile device 102 and remote device 202 each connecting to the cloud service. The cloud service may be operated by a provider of services for system 200. In the depicted example, network 204 includes a central server 206, which may be controlled by the provider of some or all of system 200. Central server 206 may comprise one or more computer devices 800, such as is known for data centers and cloud services. Further, depending on the specific needs of a given implementation, central server 206 may be implemented in a distributed fashion, with multiple nodes potentially located in geographically diverse areas.

Central server 206 may be configured to handle some or all of the functionality of system 200 described above. For example, central server 206 may handle processing of a video stream from mobile device 102, and/or processing insertions of AR objects from remote device 202. Central server 206 may further coordinate the synchronization of one or more AR objects placed by remote device 202 to mobile device 102, for presentation on a screen associated with mobile device 102. In some embodiments, central server 206 may handle any image analysis, including object recognition or AI processing, which may be used to help compute the point cloud and/or any associated anchor points or features. In other embodiments, central server 206 may receive the results of any image analysis, and supply the results to mobile device 102. In yet other embodiments, central server 206 may receive video from mobile device 102 as described above, and handle processing.

Some combination of any of the foregoing embodiments may also be possible, with a different approach taken depending upon the nature and capabilities of a given mobile device 102. For example, where mobile device 102 is a smartphone running a dedicated app, mobile device 102 may be able to perform some or all object recognition on a captured video. In contrast, where mobile device 102 is a web browser, and the web browser is not capable of processing, for example, captured video at a minimum desired quality and/or functional ability, the mobile device 102 may simply pass some or all of video to central server 206 for processing and recommendations.

Mobile device 102 and remote device 202, in the disclosed embodiments, are capable of establishing a two-way communications link, thereby allowing a user of mobile device 102 to directly connect to remote device 202 without need of leaving system 200. In some embodiments, system 200, such as via central server 206, coordinates communications, acting as a relay or communications provider. In such embodiments, central server 206 may also coordinate exchange of AR objects between mobile device 102 and remote device 202. In other embodiments, mobile device 102 and remote device 202 directly link over network 204 without going through a central server 206. In such an embodiment, any AR objects inserted into the video stream are communicated directly from one device to the other. In some such embodiments, either mobile device 102, remote device 202, or aspects of both, may provide the functionality and serve in the capacity of central server 206. It should be understood by a person skilled in the relevant art that the labeling of mobile device 102 and remote device 202 are only for the sake of example to denote a likely relationship between the users of each device. There may be no practical difference (if any difference at all) between the functionality and capabilities of mobile device 102 and remote device 202.

In some embodiments, the mobile device 102 is not equipped to directly capture the point cloud data. In one embodiment, the point cloud data may be at least partially computed from the video stream, using techniques such as photogrammetry to calculate depth data from adjacent video frames that provide slightly different views, similar to views that may be obtained from a stereoscopic camera. In another embodiment, one or more device associated with the mobile device 102 may sense and/or otherwise capture data that may include point cloud data or contain data that may be used to determine point cloud data, polygonal data for a 3D model, and/or other data representing and/or otherwise corresponding to an environment. Such point cloud, polygonal or other data corresponding to scanning and/or representing an environment, as well as data/information/sensor readings that may be used to derive a representation of the environment, e.g., camera pose/motion data, may be generally referred to as "modeling data". In some embodiments, computation and/or processing of such modeling data may be handled by the mobile device 102 directly, such as with an AR API that is running on the mobile device 102. In such implementations, modeling data is transmitted from the mobile device 102 to the remote device 202.

Alternatively or additionally, some or all of the modeling data may be computed by one or more server, e.g., central server 206, operating individually and/or collectively to handle a computation task. In such embodiments, the mobile device 102 may send a video stream along with modeling data to the central server 206. The central server 206 may then compute the point cloud, 3D polygonal model and/or other representation of the environment from the data, the video stream and camera pose/motion data. Use of central server 206 for calculation may be desirable in implementations the mobile device 102 lacks (perhaps only temporarily) sufficient power to compute a point cloud on the fly, and/or where the central server 206 could run enhanced or more computationally intense algorithms that would yield a more precise point cloud than an AR API running on the mobile device 102 could supply. Following computation of the point cloud, the central server 206 can then transmit the information to the remote device 202. In some embodiments, the central server 206 may also pass through to the remote device 202 the video stream and camera pose/motion data received from the mobile device 102 along with the point cloud data.

In still other embodiments, the remote device 202 may handle the processing and computation of modeling data, such as point cloud data, similar to central server 206. In such embodiments, the mobile device 102 may transmit the video stream and modeling data, such as camera pose/motion data to the remote device 202, with the camera pose/motion data tagged to the video stream frames, where the remote device 202 handles processing and computation of the point cloud data. Note one or more mobile devices 102 may operate to perform the operations described here for central server 206. Note that AR data does not have to be data about AR objects, rather, AR data may be data that corresponds to each frame in the video stream that may be necessary to enable the placement of AR objects within the captured scene.

In one embodiment, AR data may be captured contemporaneously with and/or extracted from, the video stream, and may be tagged to the video stream potentially on a frame-by-frame basis (discussed in greater detail below). The AR data may include camera motion/camera pose data (such as captured by spatial position sensors 106), AR feature point data, depth data directly measured by a depth sensor and/or other sensor, predicted and/or computed depth data, as discussed above, and/or disparity maps. Other embodiments may include additional data types, different data types, or fewer data types. The various types of AR data may be derived from various raw data inputs, including RGB images (such as the sequence of frames of the video stream), camera intrinsics/pose and/or camera transforms (such as from camera 104 and/or spatial position sensor 106), 3D feature points, and/or depth images, among other types of possible data. RGB images may be extracted from video stream frames.

Figure 3:
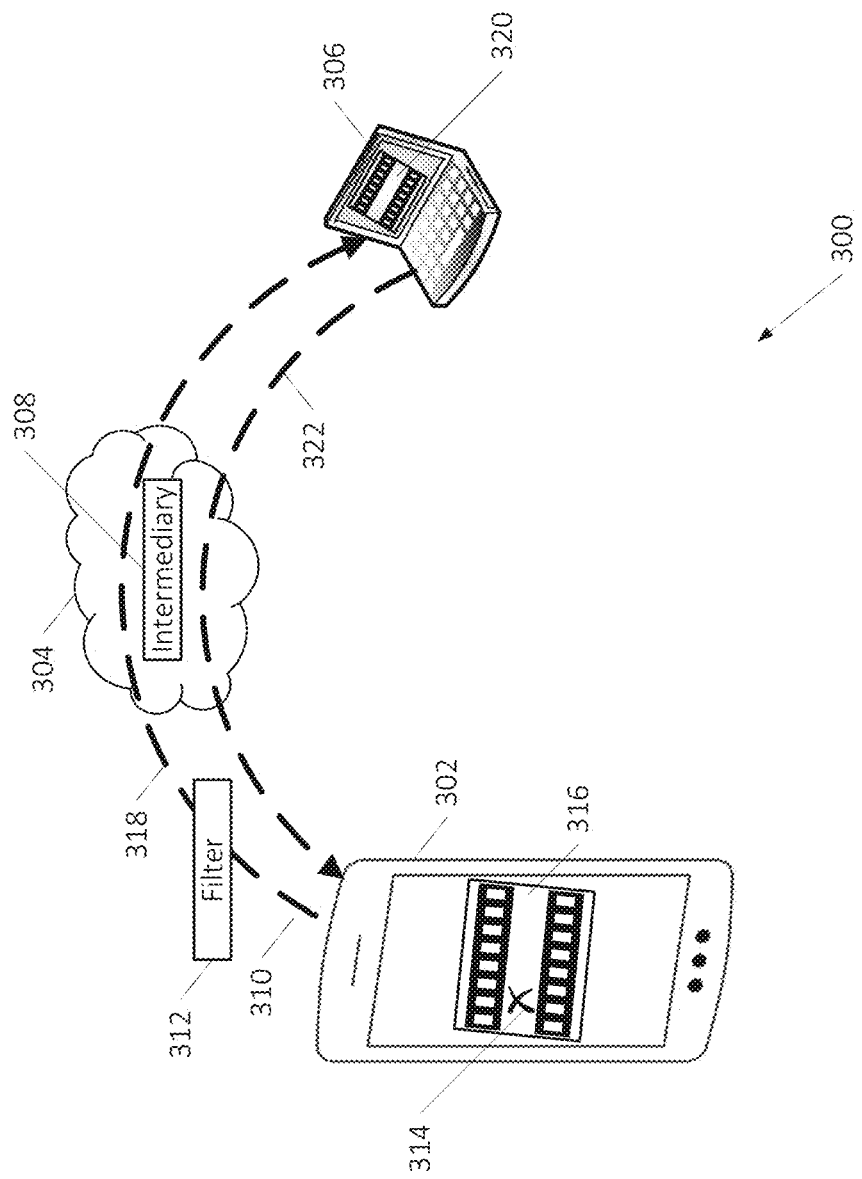
FIG. 3 illustrates a block diagram of a system for filtering a captured video stream, according to various embodiments.

FIG. 3 illustrates a block diagram 300 of a system for filtering a captured video stream, according to various embodiments. A device 302, such as FIG. 1 mobile device 102, may be used to send data over one or more network(s) generally represented here by cloud 304 to a remote machine 306. Intermediary device(s) and/or machine(s), such as routers, gateways, proxies, servers, etc. generally represented by box 308 may be part of and/or access points for a communicative coupling between the device 302 and a remote machine 306. It will be appreciated the device 302, remote machine 306 and/or intermediary 308 may include and/or provide Artificial Intelligence (AI) to assist with hosting, modifying, or engaging with an AR session between the device 302, and one or more participant, e.g., remote machine 306.

An Augmented Reality (AR) session may be established between the device 302 and the remote machine 306. In the illustrated embodiment, data (AR and/or video stream and/or other data) may be sent 310 from the device 302 (e.g., a mobile device). This data may be processed by a filter 312 that may, for example, as discussed above, operate to edit, modify, enhance, screen, etc. a video stream associated with an AR session. Note that while the foregoing discussed a device 302 communicating with a remote machine 306 it will be appreciated the illustrated embodiment is exemplary and that some or all operations associated with the device and the remote machine may be performed on a device-local basis. In the illustrated embodiment, assume the device captures a video using a camera built into the device, where the device and remote machine engage in an AR session in which one or more of entities involved in the AR session, e.g., the device, remote machine and/or other entities such as a hosting server and/or AI (e.g., they may be within the intermediary 308) may superimpose and/or place AR objects in a video stream as it is captured (or after capture), or replace, edit, transform, etc. AR objects placed in a video stream, and/or manipulate or transform the video stream as it is captured and transmitted between entities in the AR session.

In the illustrated embodiment, the device 302 may access a cloud service, e.g., hosted on an intermediary 308 device that may assist with managing and/or hosting the AR session. The cloud service may, for example, assist with coordinating an AR session between the device (e.g. a handheld phone) and a remote machine 306 (such as a computer used by a remote support agent). As noted above, selected ones of the device 302, remote machine 306, and/or any intermediary 308 such as a cloud service, Artificial Intelligence (AI), machine, etc. may operate to modify content of an AR session, e.g., associated audio and/or visual data, etc., to remove and/or replace content within the AR session to comply with local and/or remote interest, desire, regulation, content policy, etc. For example, there may be a policy to remove personally identifiable information (PII) from a video stream in an AR session, and such removal (and substitution for something else) may be performed to prevent another entity engaged in the AR session, such as the remote machine 306 to see the PII. In the illustrated embodiment, the device 302 may send 310 data including video data to be reviewed to a filter 312 that may receive the data and filter it according to, for example, applicable policy, rule, law, regulation, etc. Although the filter is illustrated as being between the device and the cloud 304, it will be appreciated a filter may be disposed within device 302, operating in an edge router/gateway providing access to the cloud, or be a separate machine/device providing filtering services.

If the device has target content 314 to be filtered out of a video stream 316 by the filter 312, after the filtering, AR session data 318 may be transferred over one or more network(s) (represented by cloud 304) to the remote machine 306. However, after filtering, the target content 314 is no longer present in the corresponding video stream 320 accessed by the remote machine. Since the modification to the video stream is part of an adjustment to an AR session, both the device 302 and remote machine may view the same adjusted video stream, e.g., for the device the target content may disappear from the video stream 316 displayed on the device. And, since the device and remote machine are engaged in an AR session, the remote machine may augment the AR session and send data 322 back to the device that may filter, place objects and/or otherwise manipulate an AR model developed by and/or for the device. In such fashion, while the device is in a session with the remote machine the AR model may be dynamically adjusted or reconfigured in accord with applicable policies, rules, interests, etc.

It will be appreciated filtering may also include simply dropping some frames in a video stream if, for example, the filter for the device 302 determines only a few frames are impacted by targeted content. In addition, a filter local to the device, such as filter 312, may determine it is unable to perform the filtering (e.g., it requires more resources than are available to the device). In this situation, relevant frames of an affected video stream may, for example, be marked such that an upstream server (e.g., an intermediary 308 machine) may recognize the marking and perform filtering for the device. Marking may be an undetectable marking, such as a digital watermark encoded into frames of the video stream, or it may be by visibly manipulating bits in a known region of a video stream. An upstream entity (such as a hosting server) would look for such manipulated bits or watermark and filter appropriately. Where possible, bit manipulation may be encoded into over/under scan portions of a video stream (e.g., nonvisible portions) if available to hide such frame marking. In one embodiment, a logo or other marking on the video stream (such as may be identifying an AR host) that happens to be presented on many if not all frames of a video stream may be modified on affected video frames to (subtly) identify a need for upstream filtering on the marked frames without noticeably affecting the quality of the video stream presented.

Figure 4:
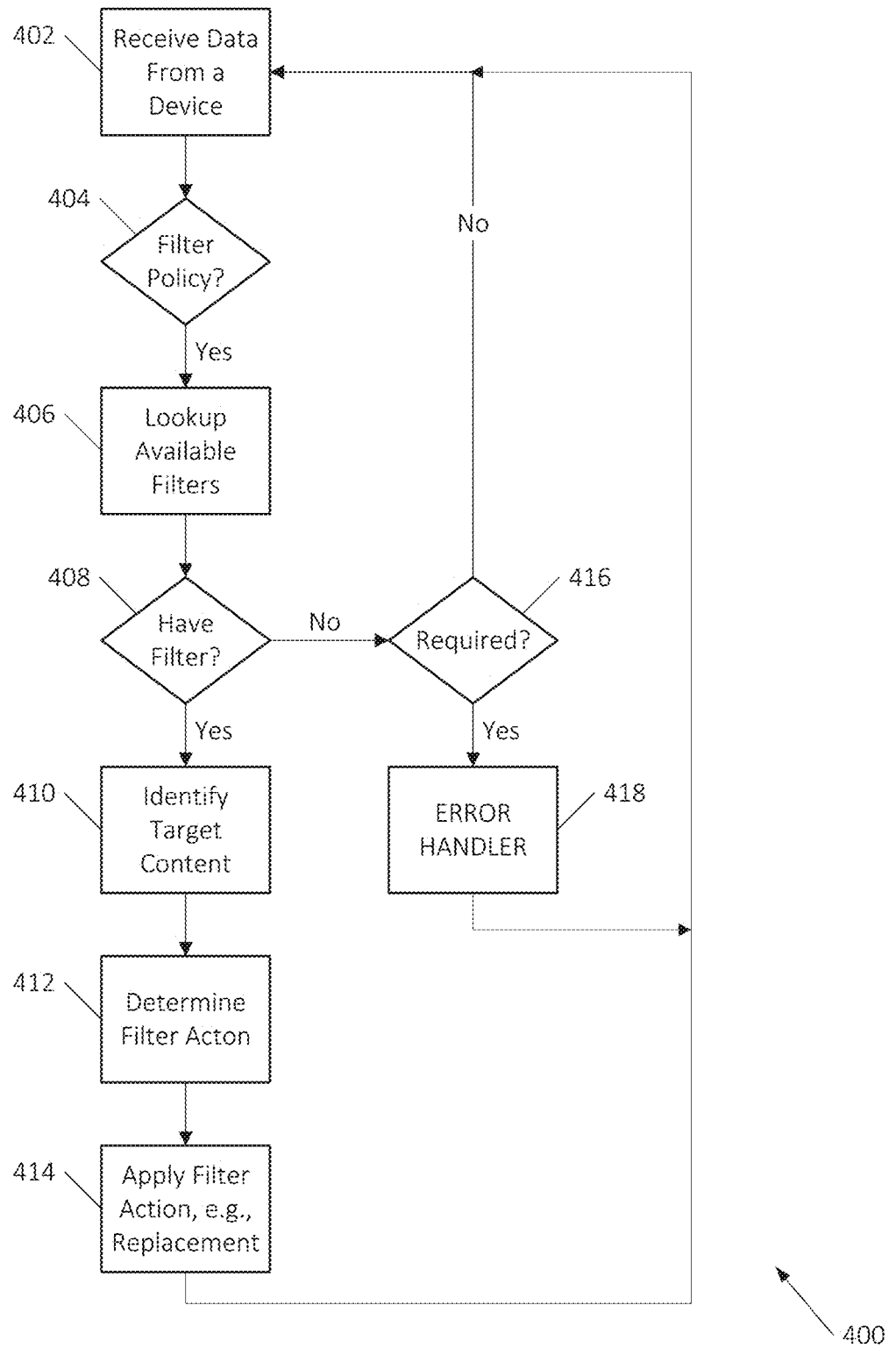
FIG. 4 illustrates a flowchart for filtering a video stream, according to various embodiments.

FIG. 4 illustrates a flowchart for filtering a video stream, according to various embodiments, such as by a FIG. 3 filter 312. As illustrated, a first operation may be to receive 402 data from a device, such as the FIG. 1 mobile device 102. The device may capture video data, such as during an AR session, and send 310 (FIG. 3) AR session data (or just a portion of the data, e.g., only video stream data) to the filter 312. The filter may receive 402 the data from the device. The filter may then evaluate if 404 there is a desire, policy, or other consideration in effect indicating a desire to perform filtering. For example, no filtering might be desired, if, for example, an AR session is between two entities at the same organization, or between friends or family, etc. and hence there is no need or desire to introduce additional cost, complexity, overhead, or other burden (if any) by applying filtering to the AR session.

If 404 there is a policy indicating a desire to perform filtering, the filter may continue with looking up 406 available filters applicable to the received data, e.g., relevant to the current AR session or other context for the data (see also item 410 discussion). For simplicity, the present discussion assumes a context of an AR session and processing a video stream associated with the AR session, but of course other environments or circumstances are also intended to be included. In the illustrated embodiment, assume there is a policy to filter out personally identifiable information (PII) from an AR session. It will be appreciated a PII filter is exemplary, and there may be multiple (possibly many) filter policies to be applied to the AR session. If 408 the desired filter is available, then target content satisfying the desired filter may be identified 410. If no matching target can be found, processing may loop (not illustrated), for example, back to lookup 406 other applicable filters for received data, back to receiving 402 more data, or to take some other action as desired. In an alternate embodiment, a best-match filter may be utilized, or if a collection or sequence of filters can implement/perform a desired policy, the collection/sequence of filters may be applied and satisfy the check 408.

In various exemplary implementations, target content may be identified 410 by application of recognition techniques, such as performed by Internet search engines, Google Vision AI, surveillance systems, Artificial Intelligence (AI) tools, machine vision systems, video content analysis (or analytics), object recognition systems, object segmentation systems, autonomous vehicle vision, etc. Recognition techniques may be used to recognize people, faces, places, animals, activity, semantic and/or syntactic content, image classification, etc. Use of AI (or AI "Engines", or "machine intelligence") is also increasing as it provides flexibility and expandability of ability to recognize content and contexts of interest. It will be appreciated there are many different AI Engines that may be used, such as neural networks (feedforward, recurrent, backpropagation, deep learning, generative adversarial network, etc.), expert systems, and many other analytical systems. See, for example, recognition systems based on convolutional neural network (CNN), recurrent CNN (RCNN), region based CNN (R-CNN), vision transformer (ViT) based networks, and variations, e.g., "fast" or "faster" R-CNN, YOLO (You Only Look Once), or the like. It will be appreciated these AI examples are just a few of many different possible systems and techniques that may be used to recognize or otherwise identify target content of interest to filter.

When target content is identified 410, a filter action may be determined 412, e.g., to remediate/redact the target content as desired. For example, as discussed above, different actions may be taken on identified target content. What action to take may depend on preference, hardware constraint, timing consideration (e.g., speed), or other reason. For example, if the device capturing video is a low-power device, then it may be desired to perform a simple blurring or other remediation that might work better on a lower-power device. In contrast, on a high-powered device (e.g., having abundant processor, memory, etc.) a more complex operation such as object replacement may be performed. As an example, if the device capturing video is transmitting a video stream showing a credit card on a table, family photos of children, or something embarrassing, filter policy for the device may be to blur out the credit card, substitute the children photos with generic/royalty free images (e.g., by using deepfake technology to replace the faces) to protect their privacy, and digitally remove embarrassing content by subtracting it from the video stream and filling in that space with complementary (e.g., not embarrassing), for example, prefabricated scalable placeholders, or content derived from video content around the subtracted item and/or from other content seen in the video stream. It will be appreciated these are exemplary filtering actions and a filter may remove, obfuscate, overlay, add to, subtract from, or take and desired action to modify or transform data, including modifying audio and/or video associated with an AR session.

Once the desired filter action is determined 412, the filter may be applied 414 so AR session data from the device is adjusted as desired. It will be appreciated application may be before, for example, a video stream from the device is viewed by a remote device, e.g., FIG. 3 remote machine 306. In this exemplary illustrated implementation, if 404 for example a PII filtering policy is desired, and if 408 the PII filter in not available, a further test may be performed to check if 416 the desired filter is required to continue an AR session. For example, a desire to filter out children that may wander into an AR session (as is known to happen), or to filter out pets (visually and/or audibly as filtering is intended to also apply to filtering of sounds, not only video/visual content). If 408 for some reason a needed filter is unavailable, and if 416 it is not considered required, processing may loop back to, for example, to receiving 402 more data to process. It will be appreciated this is a simplified program flow and other actions and error conditions and/or User Interface (UI) activity is not being addressed here. If 416 however the filter is required, such as if the issue is filtering out PII (financial data, embarrassing content, identity data, identification documents, pictures of minors, etc.) then processing may continue with an error handler 418. For example, in an exemplary implementation, if a filter is not available or if a video is unable to be processed by a filter, the content is automatically flagged by the error handler for review, such as by a human expert.

Figure 5:
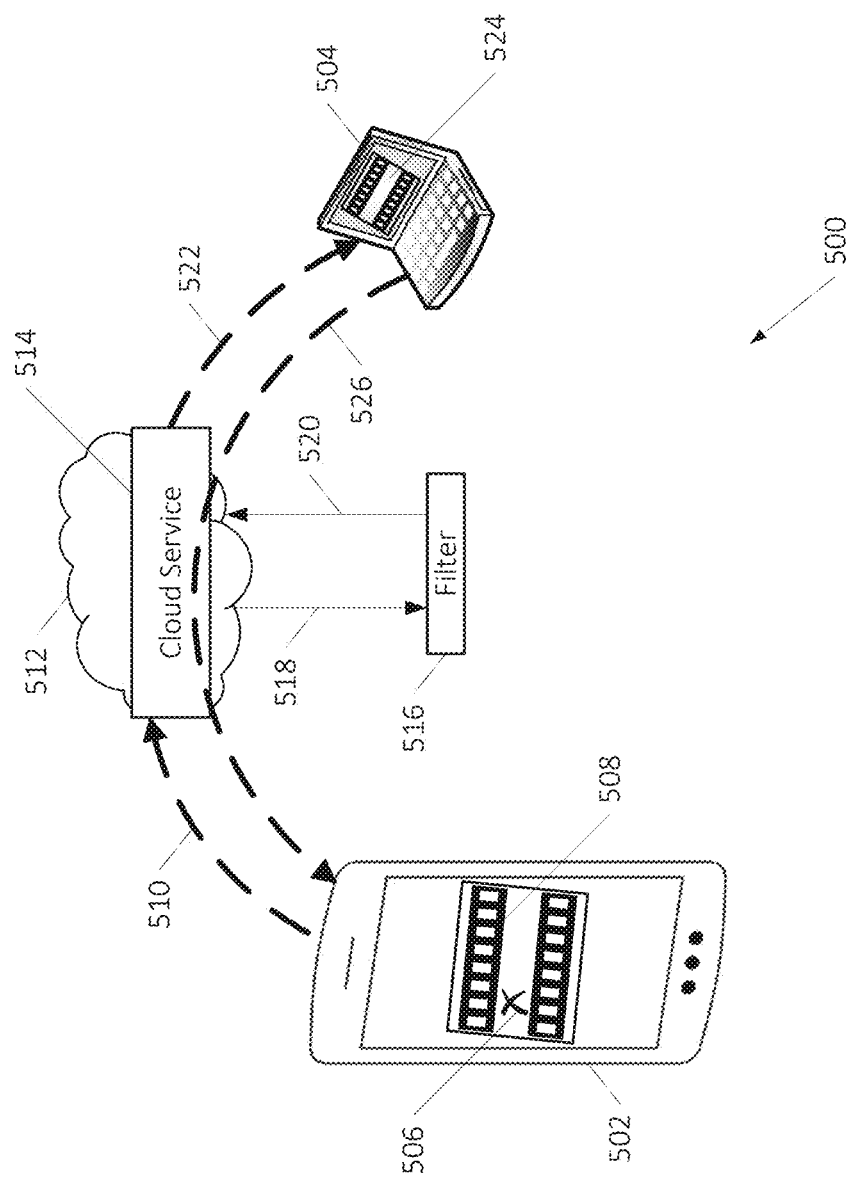
FIG. 5 illustrates a block diagram of a system for filtering a captured video stream, according to various embodiments.

FIG. 5 illustrates a block diagram 500 of a system for filtering a captured video stream, according to various embodiments in which a device 502 (such as FIG. 1 mobile device 102, or FIG. 3 device 302) may be used to send data over one or more network(s) 512 to a remote machine 504 (such as the FIG. 3 machine 306). In this embodiment, target content 506 in a video stream 508 should be filtered out as discussed above with respect to FIGS. 3-4. In this embodiment, assume the filter is to hide the target content so that the video stream looks like it was never there. It will be appreciated the video may be edited to fill in removal of the target content, or, for example, a different object may be substituted instead.

As illustrated, data 510 from the device is sent over one or more networks (represented here as cloud 512). Communicatively coupled with cloud 512 is a cloud service 514 which in this exemplary implementation is hosting the AR session between the device 502 and the remote machine 504. In addition to hosting, the cloud service is providing a filter 516 that operates to identify the target content 506 and remediate/replace it. The data 510 from the device may be accessed by the cloud service and provided 518 to the filter 516, and after filtering, filtered data 520 may be sent back to the cloud service. In the illustrated embodiment, the filtering may not necessarily be in real time. For example, the cloud service may provide post-processing editing of a video stream that may operate in near real time, time delay, scheduled, etc. For example, akin to a delay introduced to phone calls, where there is an audio delay to accommodate transmission delay or transitory transmission issues, such as from packet loss in a packet-based service such as VOIP (Voice Over IP (Internet Protocol)), there may be a delay to accommodate AR data (e.g., data 510) filtering delay.

The filtered data may then be provided 522 to the remote machine 504. In the illustrated embodiment, the filter 516 is shown external to the cloud service. It will be appreciated the cloud service may be a server or other machine that incorporates the filter as a hardware and/or software component, or the filter may be a standalone hardware and/or software filtering service in use by the cloud service. Further, as discussed above, the filter 516 may operate in conjunction with other filters that may have been applied to the data 510 from the device, such as by a filter for the device (e.g., FIG. 3 item 312) or by some other device (not illustrated) on an intermediary between the device and the cloud service.

As discussed with respect to FIG. 3, after the filter 516 the remote machine 504 receives a modified/redacted data 522 corresponding to the data 510 from the device, where the video stream 524 accessed by the remote machine does not include the target content 506 present in the device's original (unfiltered/unedited) data. It will be appreciated certain filtering operations require more computational ability and or resources to effectively filter in real or near real time during an AR session. The cloud service 514 providing the filter 516 may have better resource access and provide a more robust, e.g., real time, filtering unavailable to a lower-powered machine such as the device 502. Thus, for example, as discussed with respect to FIG. 3, if the data 510 is marked, such as with a watermark, predetermined bits within a video frame, logo adjustment, etc. to indicate one or more frame needs filtering not yet performed, or not performed as well as desired, the filter 516 may be used to perform or augment previous filtering. It will be appreciated the device 502 may encode the type of filtering needed, and the cloud service may then apply the appropriate filter and/or the cloud service may determine what needs to be filtered (see, e.g., FIG. 4 items 410-414). In one embodiment, all AR session data 510 from the device 502 is always reviewed for filtering, e.g., every video frame is treated as if it was marked for filtering.

And, as discussed above with, for example, FIG. 3, since the device 502 and remote machine 504 may be engaged in an AR session, the remote machine may augment the AR session and send data 526 back to the device that may filter, place objects and/or otherwise manipulate an AR model developed by and/or for the device. In such fashion, while the device is in a session with the remote machine the AR model may be dynamically adjusted or reconfigured in accord with applicable policies, rules, interests, etc.

Figure 6:
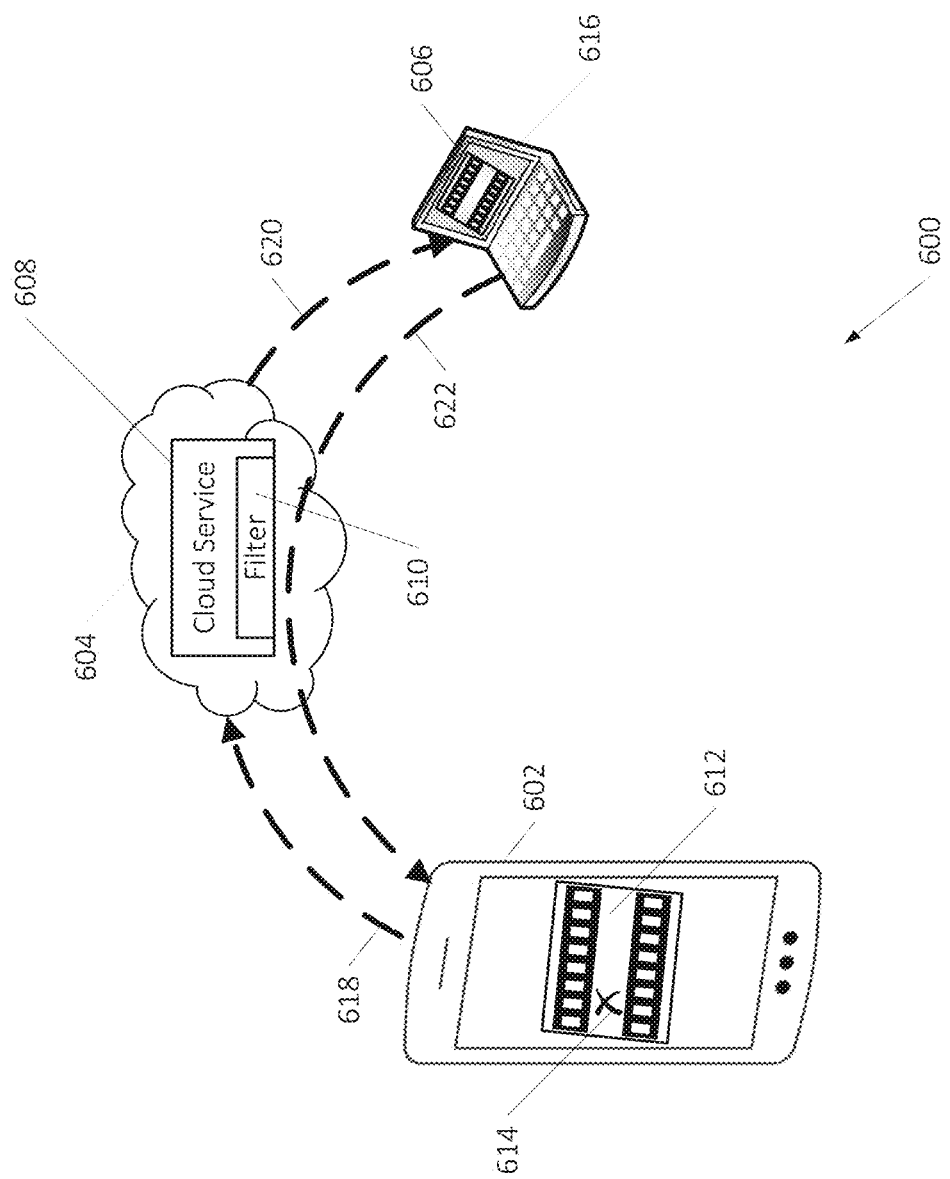
FIG. 6 illustrates a block diagram of a system for filtering a captured video stream, according to various embodiments.

FIG. 6 illustrates a block diagram 600 of a system for filtering a captured video stream, according to various embodiments in which a device 602 (such as FIG. 1 mobile device 102, or FIG. 5 device 502) may be used to send data over one or more network(s) (represented here as cloud 604) to a remote machine 606 (such as FIG. 5 machine 504). In this embodiment, the device may engage in an AR session hosted by a cloud service 608 operating "in the cloud", e.g., as one or more server(s) or a distributed collection of one or more servers) and/or other machines collectively and/or cooperatively operating to provide one or more AR hosting or other service(s)) accessible over the cloud 604 network(s). The cloud service provides a filter 610 that may operate to provide redaction/replacement/etc. functionality discussed above.

In this exemplary embodiment, the filter 610 may be designed to operate in real time, and receive data 622 from the device 602, for processing in real time by the filter. Note that use of the terminology real time is not intended to be limited to an immediate/no-delay processing by the cloud service 608. While real time service is possible, it will be appreciated any communication technology and/or process may have various delays for various reasons. Therefore "real time" should be interpreted herein to mean processing as immediately as possible, e.g., substantially in real time. Contrast this with the FIG. 5 embodiment which accommodates delayed processing and therefore could, for example, provide for a store-and-forward support experience, where an expert using the remote machine could see a filtered video stream at some time after the video stream was recorded, engage with it and send a video back for later access/review by the device. This FIG. 6 embodiment is focused more on providing a substantially live engagement between the device and the remote machine 606.

In one exemplary implementation, the cloud service supports real time communication with the filter using WebRTC, which provides for media capture (e.g., audio and/or video, screen recording, etc.), as well as peer-to-peer connectivity to allow endpoints to a communication session, such as the device 602, cloud service 604, and/or remote machine 606 to share data in accord with the Web Real time Communications (WebRTC) protocol. See, e.g., Uniform Resource locator (URL) w3.org/TR/webrtc for more information on WebRTC. See also a discussion of the JavaScript Session Establishment Protocol (JSEP) and WebRTC in the Internet Engineering Task Force (IETF) RFC 8829 at URL datatracker.ietforg/doc/html/rfc8829. The reader is presumed to be familiar with these technologies. It will be appreciated by one skilled in the art that these are simply a few representative technologies that may be employed to provide a filter real time or substantially real time access to AR data, such as a video stream from the device, and that improvement to these and/or other future technologies providing a related and/or equivalent service are intended to be included in the scope of this discussion.

In one exemplary implementation, an HTML5 Canvas (a canvas is an element provided by HTML5) may be used to render filtered data (see, e.g., URL w3.org/TR/html5). That is, captured video stream 612 containing targeted content 614 may be filtered by the filter 610 and presented on the remote machine 606 where the remote machine video stream 616 does not contain the targeted content 614. It will be appreciated WebRTC (or an equivalent real time transport) may provide for sending the data 618 (such as a video stream), and for sending filtered AR data 620 from the cloud service 608 to the remote machine. It will be appreciated multiple different techniques may be used to receive and render data transported by WebRTC. In one embodiment, filtered data may be synchronized with a websocket (see, e.g., URL datatracker.ietf.org/doc/html/rfc6455) and rendered onto an HTML5 Canvas. Alternatively, the filtered data may be sent to a GStreamer plugin operating, for example, on the device and/or remote machine, for display (see, e.g., URL gstreamer.freedesktop.org). The reader is expected to be familiar with technology such as HTML5 Canvas, WebRTC, websocket, GStreamer, JSEP, and the like as exemplary technology that may be used to implement various aspects of the exemplary illustrated embodiments.

It will be appreciated Artificial Intelligence (discussed above) may be utilized by the filter 610 to facilitate identifying targeted content 614 to filter from a data stream such as AR data 618, as well as to effectively perform the redaction/remediation of the data to remove or replace the targeted content (or take other action). For example, existing trained AI models for recognizing faces, people, objects, financial data, identification data (e.g., driver's license, passport, ID, badges, etc.) may be used to scan, for example, frames of a video stream in the AR data 618 received from the device 602. However, there may be other concerns specific to the cloud service that might not be part of an existing AI model, such as context specific issues unique to a specific AR session hosted by the cloud service. For example, if the cloud service has a known competitor "Company A", the AR data from the device may be reviewed for data identifying the competitor, e.g., Company A's logo—this logo could be removed from the AR data before it would be accessed by the remote machine 606. Similarly, if Company A were a known competitor to one of the endpoints in an AR session, again this session-specific interest would support editing the AR session to avoid Company A information being in the AR session.

As a related issue, the cloud service 608 may maintain a collection of logos and other identifiable indicators of many different companies and decide to automatically redact AR data to replace such information with replacement content. It will be appreciated the filter 610 may be silent and transparent, and like a deepfake replacement, it is intended to be difficult to detect alteration, e.g., providing seamless filtering. Alternatively, a generic logo, indicator, placeholder, or the like for the cloud service may be substituted over target content to make it dear a replacement/filtering has occurred. For such session-specific issues of the cloud service, the AI tools and/or environment may include special training to recognize logos or any other content of interest and/or concern to the cloud service. With such training, as discussed above, identified target content 614 may be removed. In some embodiments, after an AR session, participants to the AR session may be asked whether there was content that should have been filtered, but was missed. AR data, such as the video stream may at least temporarily be stored and allowed to be reviewed and marked to identify missed target content. Such identification may be used to refine and improve the filtering. It will be appreciated the filter and filtering functionality may be incorporated into any of the entities engaged in an AR session, e.g., in an AR session, the device, cloud service, and remote machine may all provide and/or utilize a filter.

Figure 7:
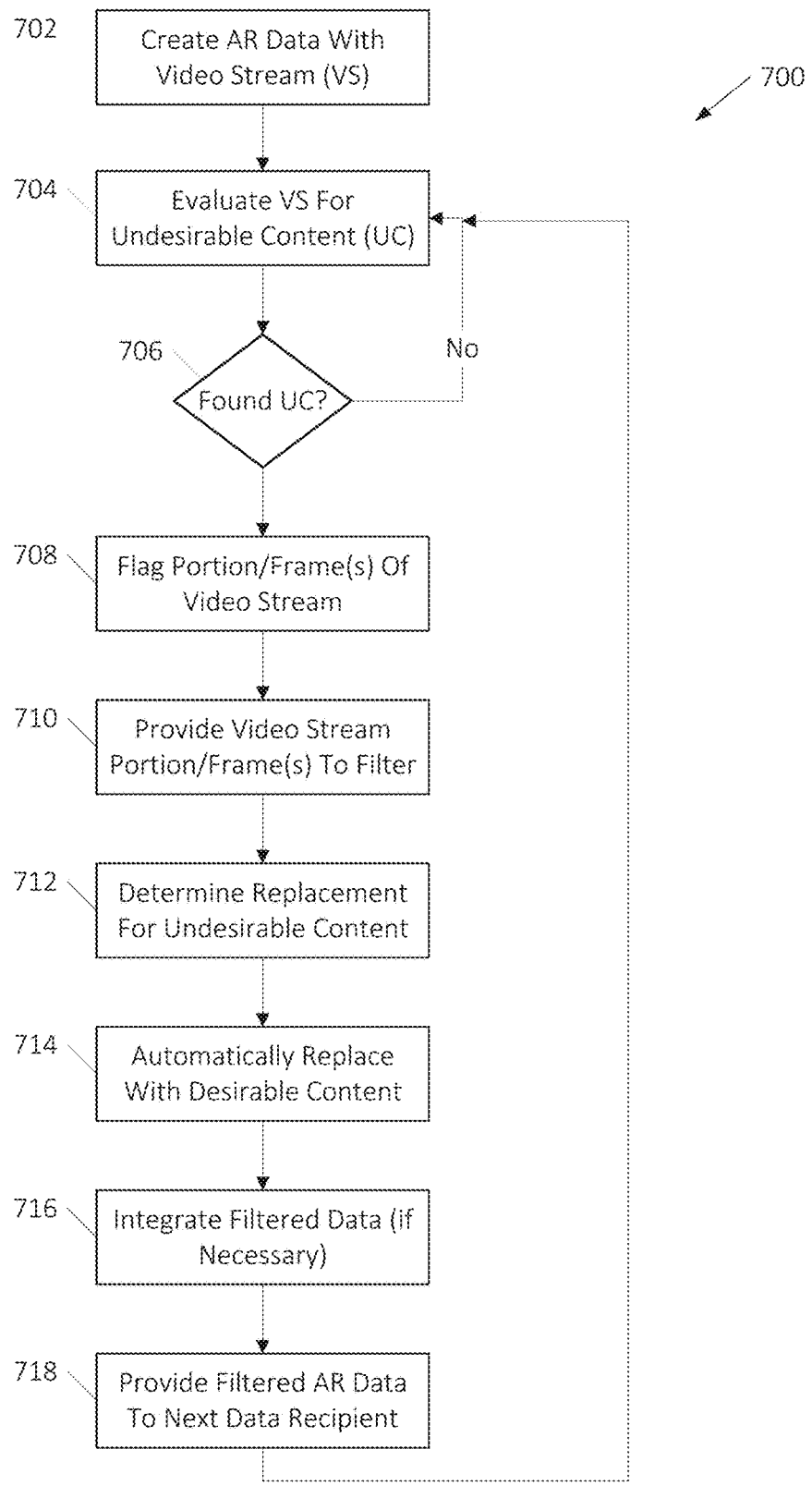
FIG. 7 illustrates a flowchart for filtering a video stream, according to various embodiments.

FIG. 7 illustrates a flowchart 700 for filtering a video stream, according to various embodiments, such as discussed above with respect to FIGS. 1-6, As discussed, Augmented Reality (AR) data of an AR session may have an associated video stream containing undesirable content, e.g., target content discussed with respect to FIG. 4, to be identified and replaced in the AR session prior to access of the AR session, e.g., such as by a remote machine.

A device, such as the FIG. 1. handheld device 102, may create 702 the associated video stream. As discussed above the video stream may be filtered locally and/or remotely with respect to the device creating the AR data/the video stream. In order to know if modification to the AR data is needed, e.g., whether the content of the video stream needs to be filtered, an evaluation 704 of at least a portion of the video stream is performed to see if the content contains undesirable content. For simplicity this evaluation is presumed focused on inspecting and evaluating the video stream, but it will be appreciated any part of the AR data for an AR session may he evaluated and filtered. As discussed above, an Artificial Intelligence (AI) may be used to review data against its models and/or classifiers to recognize if 706 known or likely undesirable content is found. It will be appreciated an AI may be used to classify any content in the data. It may specifically recognize logos or other concerns specific to a cloud service as discussed above, or it may also recognize content that fits into categories of undesirable content. Examples of undesirable content include, but are not limited to nudity, violence, hate symbols, hate speech, corporate identifier, copyrighted, unlicensed, competitor, religious, embarrassing, distracting, financial, identity, or location.

If 706 no undesirable content is found, for simplicity, processing loops back to evaluating 704 the video stream for undesirable content. If, however, undesirable content is found, then in the illustrated embodiment, the relevant portion(s), e.g., a frame or frames when reviewing video, audio packets, segments, etc. if reviewing audio (not illustrated), or other flagging as appropriate for the content being evaluated, may be flagged 708. As discussed above, if flagging video, then flagging may be by way of adjusting (visibly or invisibly) pixels within one or more video frames, watermarking, or another suitable technique. In some embodiments, meta-data identifying impacted portion(s) of the affected AR data (e.g., an index or other measure into a video) may be associated with the data. In some embodiments, a mask or other identification may be used to specifically identify the location of the undesirable content in the AR data.

The flagged/marked portion(s) of the AR data may be provided 710 to a filter, such as a FIGS. 3, 5, 6 filter 312, 516, 610, which may determine 712 a replacement content for the undesirable content. As discussed above, depending on the device implementing the filter, the filtering options may be constrained. For example, if filtering is performed by the FIG. 3 device 302, that device may have low power and hence if there is a desire to filter, then the filtering may be something lightweight such as a simple blurring of faces in a video stream. However, were the filtering to be performed instead by a cloud service hosting an AR session, such as the FIG. 6 item 608, a more complex filter may be employed, such as to use deepfake or other technology to seamlessly replace faces with computer generated fake faces. It will be appreciated while an AI is presumed to support the filtering processes discussed herein, other machine intelligence environments, computer vision environments, etc., may be employed even if they are not labeled as being an Artificial Intelligence per se.

Also, it will be appreciated the filter may incorporate the AI, e.g., in effect with the filter being the AI, or the filter may be communicatively coupled to the AI, whether internal to a machine or device over one or more internal and/or local buses, or it may communicate directionally or bi-directionally machine-to-machine over a communication path such as a network or high-speed interconnect. Note also since the communication between endpoints to an AR session, such as the FIG. 3 device 302 and remote machine 306 represents a pipeline that may include multiple intermediary 308 machines and/or devices and/or servers, etc., each of the intermediary and remote machine may also filter the AR data and hence while a mobile device such as device 302 may only be capable of blurring content, an intermediary 308 may be configured to improve upon the limited filtering of the device 302.

In the illustrated embodiment, it is assumed there is a desire to filter as quickly as possible, so the undesirable content is automatically replaced with desirable content determined by a filter acting on the AR data. It will be appreciated the filter may have only received the portion of the AR data containing the undesirable content, and if so, after filtering/replacing 714 undesirable content, desirable content may be integrated 716 back into the AR data. Thus, for video this may in effect operate to substitute flagged 708 video stream frames with updated replacement frames, or it may act to overwrite portions of the affected frames with the desirable content, or otherwise integrate with the AR data as needed. Once integrated, the now filtered AR data may be, for example, provided to the next data recipient. For example, in the FIG. 6 embodiment, the cloud service 608 forwards filtered AR data to the remote machine 606. In this illustrated embodiment, following the filter pipeline concept, the next data recipient may in turn evaluate 704 the video stream for undesirable content. As discussed above, this evaluation may include local/new considerations not evaluated previously.

In some embodiments, a cost-benefit analysis may be performed to determine, for example, a severity rating for the undesirable content, and compare that to a cost and/or impact to the AR session to perform the filtering. For example, some filters may simply express a preference to exclude certain types of content, such as faces, but it's not a stop the AR session problem were it to remain in the AR data accessed by another AR session endpoint, such as the remote machine. Therefore, in some embodiments, the evaluation 704 may factor in a cost-benefit analysis and determine that applying the filter may negatively impact the AR session and hence, at least for the moment, the lifter will be ignored. Similarly, the evaluation may determine that the impacted content is so minor or fleeting, it would barely register in the AR session, and therefore, if needed or otherwise desired, it could be skipped as if the undesirable content had not been found.

FIG. 8 illustrates an example computer device 800 that may be employed by the apparatuses and/or methods described herein, in accordance with various embodiments.

As shown, computer device 800 may include a number of components, such as one or more processor(s) 804 (one shown) and at least one communication chip 806. In various embodiments, the one or more processor(s) 804 each may include one or more processor cores. In various embodiments, the one or more processor(s) 804 may include hardware accelerators to complement the one or more processor cores. In various embodiments, the at least one communication chip 806 may be physically and electrically coupled to the one or more processor(s) 804. In further implementations, the communication chip 806 may be part of the one or more processor(s) 804. In various embodiments, computer device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computer device 800 may include other components that may be physically and electrically coupled to the PCB 802. These other components may include, but are not limited to, memory controller 826, volatile memory (e.g., dynamic random access memory (DRAM) 820), non-volatile memory such as read only memory (ROM) 824, flash memory 822, storage device 854 (e.g., a hard-disk drive (HDD)), an I/O controller 841, a digital signal processor (not shown), a crypto processor (not shown), a graphics processor 830, one or more antennae 828, a display, a touch screen display 832, a touch screen controller 846, a battery 836, an audio codec (not shown), a video codec (not shown), a global positioning system (GPS) device 840, a compass 842, an accelerometer (not shown), a gyroscope (not shown), a speaker 850, a camera 852, and a mass storage device (such as hard disk drive, a solid state drive, compact disk (CD), digital versatile disk (DVD)) (not shown), and so forth.

In some embodiments, the one or more processor(s) 804, flash memory 822, and/or storage device 854 may include associated firmware (not shown) storing programming instructions configured to enable computer device 800, in response to execution of the programming instructions by one or more processor(s), to practice all or selected aspects of systems 100, 200, 300, 500, 600, flowcharts 400, 700, and/or related methods described herein. In various embodiments, these aspects may additionally or alternatively be implemented using hardware separate from the one or more processor(s) 804, flash memory 822, or storage device 854.

The communication chips 806 may enable wired and/or wireless communication to transfer of data to and from the computer device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computer device 800 may be a laptop, a netbook, a notebook, an ultrabook, a smartphone, a computer tablet, a personal digital assistant (PDA), a desktop computer, smart glasses, or a server. In further implementations, the computer device 800 may be any other electronic device that processes data, and the device may be stand alone or incorporated into another machine, including transportation devices such as cars, motorcycles, planes, trains, etc.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 9:
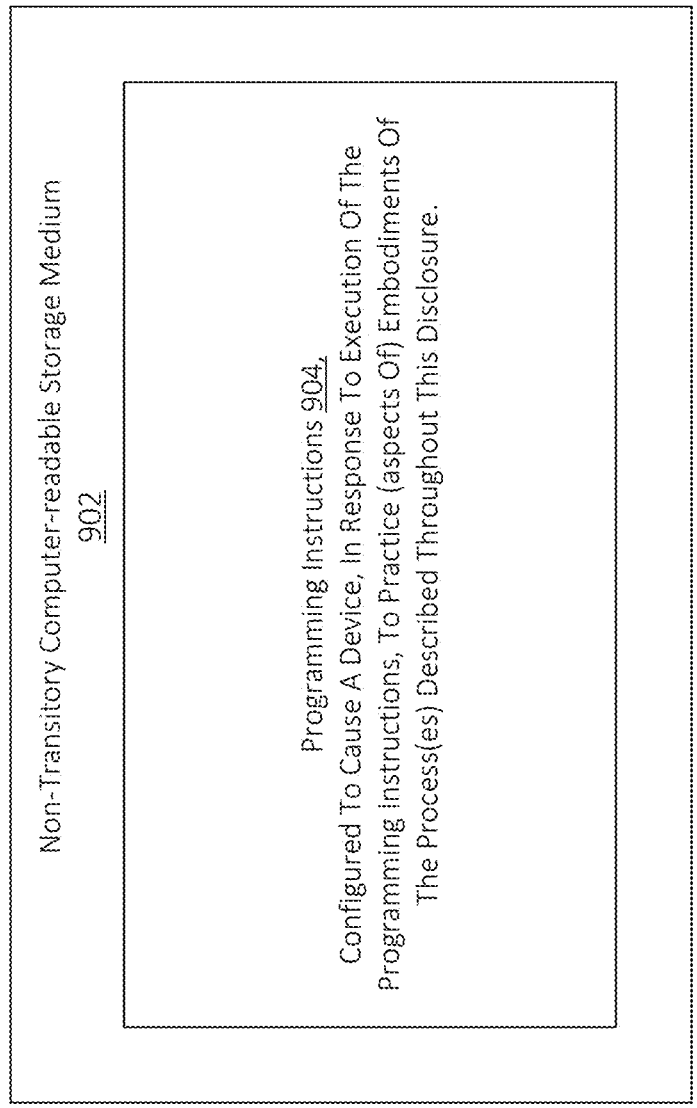
FIG. 9 is a block diagram of a computer-readable storage medium that can be used to implement some of the components of the system or methods disclosed herein, according to various embodiments.

FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., portable device 102, or computer 800, in response to execution of the programming instructions, to implement (aspects of) systems 100, 200, 300, 500, 600, flowcharts 400, 700, and/or methods discussed or recited herein. In alternate embodiments, programming instructions 904 may be disposed on multiple computer-readable non-transitory storage media 902 instead. In still other embodiments, programming instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even he paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for filtering Augmented Reality (AR) data having associated therewith a video stream to identify and replace an undesirable content identified in at least the video stream prior to an access of the video stream, the method comprising:
   receiving at least a section of the video stream for the AR data;
   evaluating at least the section for containing the undesirable content, the evaluating including at least comparing the section with one or more indicator of undesirable content;
   identifying the undesirable content in a portion of the section, the portion including at least one video frame of the video stream in the AR data;
   categorizing the undesirable content with a classification;
   selecting a replacement for the portion based at least in part on the classification;
   automatically determining an updated video stream based at least in part on replacing the portion with a replacement;
   providing a modified AR data including the updated video stream;
   determining a severity of the undesirable content; and
   evaluating, based at least in part on the severity, whether to flag the video frame as containing the undesirable content, or to drop the frame from the video stream.

2. The method of claim 1, further comprising determining the updated video stream in the AR data by:
   determining an AR object corresponding to the replacement; and
   placing the AR object in the AR data to replace the undesirable content in the portion.

3. The method of claim 1, further comprising:
   wherein the classification includes a selected one or more of: nudity, violence, hate symbols, corporate identifier, copyrighted, unlicensed, competitor, religious, embarrassing, distracting, financial, identity, or location.

4. The method of claim 1, wherein an Artificial Intelligence (AI) trained to assist with managing undesirable content performs at least: the identifying the undesirable content, the selecting the replacement, and the automatically determining the updated video stream.

5. The method of claim 1, wherein an artificial Intelligence (AI) is configured to apply a neural network technology to translate the undesirable content into the replacement.

6. The method of claim 1, in which a handheld device to capture the video stream, a remote machine configured to receive the modified AR data, and a cloud service to host an AR session including the AR data are coupled over at least one network, further comprising:
   accessing one or more filters disposed in a selected ones of the handheld device, the cloud service, or the remote machine; and
   cumulatively applying the one or more filter by selected ones of the handheld device, the cloud service, and the remote machine.

7. The method of claim 1, in which a handheld device to capture the video stream, a cloud service configured to determine the updated video stream, and a remote machine configured to receive the modified AR data are communicatively coupled over at least one network, the method further comprising:
   making the video stream accessible to the cloud service;
   providing the modified AR data to the remote machine; and
   accessing a further modified AR data determined by the remote machine.

8. The method of claim 1, in which a handheld device to capture the video stream, a cloud service configured to host an AR session with the AR data, and a filtering agent are communicatively coupled over at least one network, the method further comprising:
   making the AR data including the video stream accessible to the cloud service;
   filtering, by the filtering agent, the video stream to at least determine the updated video stream replacing the undesirable content with a desirable content; and
   providing access to the modified AR data by the remote machine.

9. A non-transitory computer readable medium (CRM) comprising instructions for filtering Augmented Reality (AR) data having associated therewith a video stream to identify and replace an undesirable content identified in at least the video stream prior to an access of the video stream, the instructions, when executed by an apparatus, cause the apparatus to perform:
   receiving at least a section of the video stream for the AR data;
   evaluating at least the section for containing the undesirable content, the evaluating including at least comparing the section with one or more indicator of undesirable content;
   identifying the undesirable content in a portion of the section;
   categorizing the undesirable content with a classification;
   selecting a replacement for the portion based at least in part on the classification;
   automatically determining an updated video stream based at least in part on replacing the portion with a replacement; and
   providing a modified AR data including the updated video stream;
   determining an AR object corresponding to the replacement;
   placing the AR object in the AR data to replace the undesirable content in the portion;
   determining a severity of the undesirable content; and
   evaluating, based at least in part on the severity, whether to flag the video frame as containing the undesirable content, or to drop the frame from the video stream.

10. The CRM of claim 9, wherein the instructions further include instructions to access an Artificial Intelligence (AI) trained to assist with managing undesirable content, and to direct the AI to perform at least the instructions for identifying the undesirable content, the selecting the replacement, and the automatically determining the updated video stream.

11. The CRM of claim 9, wherein the instructions further include instructions to direct an artificial Intelligence (AI) to apply a neural network technology to translate the undesirable content into the replacement.

12. The CRM of claim 9, in which a handheld device to capture the video stream, a remote machine configured to receive the modified AR data, and a cloud service to host an AR session including the AR data are coupled over at least one network, wherein the instructions further include instructions for performing:
   accessing one or more filters disposed in a selected ones of the handheld device, the cloud service, or the remote machine; and
   cumulatively applying the one or more filter by selected ones of the handheld device, the cloud service, and the remote machine.

13. The CRM of claim 9, in which a handheld device to capture the video stream, a cloud service configured to determine the updated video stream, and a remote machine configured to receive the modified AR data are communicatively coupled over at least one network, wherein the instructions further include instructions for performing:
   making the video stream accessible to the cloud service;
   providing the modified AR data to the remote machine; and
   accessing a further modified AR data determined by the remote machine.

14. The CRM of claim 9, in which a handheld device to capture the video stream, a cloud service configured to host an AR session with the AR data, and a filtering agent are communicatively coupled over at least one network, wherein the instructions further include instructions for performing:
   making the AR data including the video stream accessible to the cloud service;
   filtering, by the filtering agent, the video stream to at least determine the updated video stream replacing the undesirable content with a desirable content; and
   providing access to the modified AR data by the remote machine.

15. A system in which a handheld device, and a cloud service configured to host an Augmented Reality (AR) session having AR data, are communicatively coupled over a network, the handheld device comprising a memory for storing at least instructions which, when executed by a processor, cause at least the handheld device to:
   record a video stream during the AR session;
   compare at least a portion of the video stream with one or more indicators of an undesirable content;
   identify the undesirable content in the portion;
   categorize the undesirable content with a classification;
   select a desirable content based at least in part on the classification;
   automatically update the video stream to determine an updated AR data for the AR session that replaces the undesirable content with the desirable content; and
   provide the updated AR data to the cloud service;
   determine a severity of undesirable content in a video frame of the video stream; and
   evaluate, based at least in part on the severity, whether to
      place an AR object corresponding to the desirable content in the AR data to replace the undesirable content in the portion, or
      drop the video frame from the video stream.

16. The system of claim 15, wherein the instructions further include instructions which, when executed by the processor, cause at least one machine of the system to:
   access an Artificial Intelligence (AI) to assist with managing undesirable content;
   receive from the AI an identification of the undesirable content; and
   receive from the AI the updated AR data.

17. The system of claim 15, wherein the classification includes a selected one or more of: nudity, violence, hate symbols, corporate identifier, copyrighted, unlicensed, competitor, religious, embarrassing, distracting, financial, identity, or location.

18. The system of claim 15, wherein an Artificial Intelligence (AI) is configured to apply a neural network technology to translate the undesirable content into the replacement.

* * * * *